(12) United States Patent
Wang

(10) Patent No.: US 10,999,215 B2
(45) Date of Patent: May 4, 2021

(54) SOFTWARE-DEFINED NETWORK-BASED METHOD AND SYSTEM FOR IMPLEMENTING CONTENT DISTRIBUTION NETWORK

(71) Applicant: ZTE CORPORATION, Shenzhen (CN)

(72) Inventor: Dong Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 525 days.

(21) Appl. No.: 15/518,490

(22) PCT Filed: Jul. 7, 2015

(86) PCT No.: PCT/CN2015/083463
§ 371 (c)(1),
(2) Date: Apr. 12, 2017

(87) PCT Pub. No.: WO2016/058417
PCT Pub. Date: Apr. 21, 2016

(65) Prior Publication Data
US 2017/0237686 A1    Aug. 17, 2017

(30) Foreign Application Priority Data

Oct. 13, 2014    (CN) .......................... 201410537616.2

(51) Int. Cl.
*H04L 12/927* (2013.01)
*H04L 29/08* (2006.01)
(Continued)

(52) U.S. Cl.
CPC ............ *H04L 47/803* (2013.01); *H04L 29/08* (2013.01); *H04L 45/745* (2013.01);
(Continued)

(58) Field of Classification Search
CPC ... H04L 47/803; H04L 47/783; H04L 67/327; H04L 67/1008; H04L 45/745; H04L 65/601
(Continued)

(56) References Cited

U.S. PATENT DOCUMENTS 9,450,817 B1 *   9/2016   Bahadur ................. H04L 45/64
2013/0329601 A1 *  12/2013   Yin .......................... H04L 45/02
                                                                    370/254
(Continued)

FOREIGN PATENT DOCUMENTS

CN        101729592 A       6/2010
CN        103051539 A       4/2013
(Continued)

OTHER PUBLICATIONS

Egilmez, Hilmi E., S. Tahsin Dane, K. Tolga Bagci, and A. Murat Tekalp. "OpenQoS: An OpenFlow controller design for multimedia delivery with end-to-end Quality of Service over Software-Defined Networks." In Proceedings of The 2012 (Year: 2012).*
(Continued)

*Primary Examiner* — Suraj M Joshi
*Assistant Examiner* — Melaku Y Habtemariam
(74) *Attorney, Agent, or Firm* — Cantor Colburn LLP

(57) ABSTRACT

A system and method for implementing a CDN based on SDN are provided. The method includes: a complete service logic function of the CDN is added on an application layer of the SDN, and an application unit sends a resource requirement request and service orchestration request to an orchestration unit when receiving a CDN application request; the orchestration unit performs service orchestration in combination with related information of the SDN, sends a reservation request to a control unit to obtain a required resource, and then determines content distribution (Continued)

and content delivery paths in combination with network load balancing and routing condition; an L2 and L3 forwarding table is created and transmitted to a data forwarding unit according to related forwarding policy of an SDN control plane; and the application unit executes a related operation according to a content distribution or media access request, and the data forwarding unit forwards data.

15 Claims, 2 Drawing Sheets

(51) Int. Cl.
    *H04L 12/741*     (2013.01)
    *H04L 12/911*     (2013.01)
    *H04L 29/06*     (2006.01)

(52) U.S. Cl.
    CPC .......... *H04L 47/783* (2013.01); *H04L 65/601* (2013.01); *H04L 67/1008* (2013.01); *H04L 67/2842* (2013.01); *H04L 67/327* (2013.01)

(58) Field of Classification Search
    USPC .......................................... 709/217–219, 232
    See application file for complete search history.

(56) References Cited

U.S. PATENT DOCUMENTS

2014/0164584 A1     6/2014     Joe et al.
2014/0280817 A1*     9/2014     Uppalapati ........... H04L 41/044
                                                                                            709/223
2015/0039784 A1*     2/2015     Westphal .............. H04L 45/306
                                                                                           709/240
2015/0055623 A1*     2/2015     Li ......................... H04W 40/04
                                                                                           370/331

FOREIGN PATENT DOCUMENTS

| CN | 103346922 A | 10/2013 |
|---|---|---|
| CN | 103475947 A | 12/2013 |
| CN | 103795805 A | 5/2014 |
| WO | 2014117376 A1 | 8/2014 |

OTHER PUBLICATIONS

Zhao Heng, China Telecom Henan Branch et al., SDN Architecture-Based Bearer Network and BNG Device Evolution, ZTE Technology Journal, Dec. 2013 vol. 19 No. 6.

Dukhyun Chang et al., How to realize CDN Interconnection (CDNI) over OpenFlow, Sep. 11-12, 2012, Seoul, Korea.

B. Niven-Jenkins, Ed., et al., Use Cases for ALTO within CDNs, draft-jenkins-alto-cdn-use-cases-03, Jun. 10, 2012.

Zoltan Faigl et al.,Mobile Innovation Centre, Budapest University of Technology and Economics, Application-layer traffic optimization in software-defined mobile networks: a proof-of-concept implementation. IEEE, XP032274679.

Vijay K. Gurbani et al. Abstracting network state in Software Defined Networks (SDN) for rendezvous services, Enrico Marocco et al.

International Search Report for coresponding application PCT/CN2015/083463 filed Jul. 7, 2015; Report dated Oct. 10, 2015.

* cited by examiner

SOFTWARE-DEFINED NETWORK-BASED METHOD AND SYSTEM FOR IMPLEMENTING CONTENT DISTRIBUTION NETWORK

TECHNICAL FIELD

The present disclosure relates to a content distribution technology, and more particularly to a method and system for implementing a Content Distribution Network (CDN) based on a Software Defined Network (SDN) in a loose coupling mode.

BACKGROUND

SDN is a novel network technology emerging in recent years, and main characteristics of the SDN are control and forwarding separation, network openness and programmability, and software and hardware separation. The SDN makes conventional communication network equipment liberated from exclusive hardware binding and develop towards a direction of a universal hardware-based platform plus customized software, and implement network function virtualization, network management simplification and network deployment automation through an open programming interface. Therefore, compared with conventional network function realization and engineering implementation, equipment cost, labor cost and deployment time are greatly reduced. According to architectural hierarchies, the SDN is substantially divided into three layers from top to bottom: an application layer, a control layer and a data layer.

At present, the industry is carrying out or has carried out a large amount of standardization work on the control layer and the data layer. However, for the application layer and an internal structure thereof, particularly on how to implement integration, management and control of an application as well as combination and aggregation with another existing applications and the like, fewer discussions are made, and a development speed is relatively lower. This will cause deficiency of capabilities of the SDN in terms of usability, openness, programmability, manageability, operability, compatibility and interoperability with the existing applications and the like, which is unfavorable for healthy development of the SDN industry. Particularly, the SDN has a congenital handicap in terms of how to rapidly establish SDN developer communities and attract a large number of SDN application developers to focus on the solving of hotspot application problems, and migrating main applications in existing networks to an SDN technology and the like.

Regardless of the Open Networking Foundation (ONF) standards organization or the Open Daylight (ODL) (SDN controller open-source organization), the application layer of an SDN currently defined is mainly located to provide a highly abstract function such as network application and network service orchestration and the like. The application layer of the SDN may perform network resource request and service orchestration according to an application request of a user. That is, the application layer of the SDN upwards provides Application Programming Interface (API) calling (arctic interface) for an external user in a Representational State Transfer (REST) manner and realizes a customized application function for an external client to realize a virtual network application function; and the application layer of the SDN downwards provides network API calling (northbound interface) for an SDN controller in the REST manner, and make a resource request to a control layer of the SDN to realize a virtual network service function.

From the point of the application layer of the SDN, current related technical research and discussion and standardization work mostly focus on an aspect of the northbound interface between the application layer of the SDN and a control layer of the SDN. While during a practical application of the SDN, service externally provided by the SDN is mainly implemented through an internal orchestration function of the application layer of the SDN and interfaces (i.e. arctic interfaces, also called as application interfaces) between the application layer of the SDN and its external upper-layer application. Function requirements related to the arctic interface and function requirements related to the orchestration have yet not been fully explored, and an upper-layer service related to the arctic interface and Layer 4-Layer 7 (L4-L7) services using a northbound interface are not discussed or still under early research and discussion (such as a service chain application). Particularly on how to construct existing network services based on the SDN, no discussions have been started. Therefore, those also obstruct the integration of other existing applications and SDN applications to a certain extent and further influence the development of the SDN application and the SDN itself.

Furthermore, for existing applications (such as CDN, Over The Top (OTT) and various video media services) in the industry, with respect to the problem of how to meet continuously increasing requirements of terminal clients on service quality and a requirement on continuous reduction of overall operation and maintenance cost by fully utilizing an SDN architecture and better using an efficient, high-performance and high-cost-performance virtual network function provided by a bottom-layer bearer network through an open network programming interface, discussions are yet in a very early initial stage and there also has yet not been a definite solution, which restricts the step of migrating existing services to the SDN.

Relative to the SDN, a CDN is a relatively mature technology, and is adopted to provide distribution and acceleration of a media content, such as a webpage and a video and so on, for the Internet or a telecommunication dedicated network. The main characteristic of the CDN is that the media content is cached in multiple stages and proximity service is provided for a user to provide relatively high experience quality for the user.

Functions of the CDN mainly include two parts, i.e. content distribution and content delivery (also called as media delivery), and basic functions include content distribution/delivery, scheduling/control, storage/caching, media service and the like. At present, related definitions and standard specifications about CDNs are made by international standards organizations, such as the International Telecommunication Union Telecommunication Standardization Sector (ITU-T), the European Telecommunication Standards Institute (ETSI), the 3rd Generation Partnership Project (3GPP) and the Internet Engineering Task Force (IETF) and the like, and industry standards organizations such as the China Communications Standards Association (CCSA) and the like, and the CDNs are adopted to bear services such as Internet Protocol Television (IPTV), Community Antenna Television (CATV), OTT Television (OTT TV) and mobile streaming media and the like. According to a current CDN solution, under a limitation of the fact that a bottom-layer bearer network is not open, a CDN serving as a service network must exist as a superimposed layer and dependent on a capability of the bottom-layer bearer network. In addition, a server, storage/cache server and media server required by the CDN solution all use exclusive hardware (such as a blade server/a server with an Advanced Telecom Computing Architecture (ATCA) and the like), and the dependence on hardware architecture is very high and there is no universality. Moreover, since a network performance requirement related to the CDN (such as network bandwidth, time delay and jitter) is relatively high, great complexity is brought to network capacity expansion and consequent management of address planning, equipment configuration, node deployment, service fulfillment, software upgrading and the like. For example, along with rapid development of a service such as IPTV, CATV, OTT and mobile streaming media, the CDN is gradually being decoupled from services to become a pipeline for transmitting a content aggregating and bearing multiple services, resulting in more and more CDN deployment nodes, larger and larger network scale, more and more complex management of CDN content routing, and more and more difficult management of multiple service providers/content providers (CPs/SPs), and service configuration.

For the above problems existing in the current CDN related technical solution, in consideration of a technical development trend of a CDN, it is urgent to discuss about the integration of the CDN and the SDN, and how to introduce an SDN technology into the CDN solution to effectively solve the problems, confronting by the CDN, of closure of a bearer network, exclusiveness of hardware, complexity in management and the like to further improve openness, cost performance and usability of the CDN and further reduce overall operation and maintenance cost of the CDN.

SUMMARY

Embodiments of the present disclosure provide a method and system for implementing a CDN based on an SDN, which may effectively solve the problems, confronting the CDN, of closure of a bearer network, exclusiveness of hardware and complexity in management.

An embodiment of the present disclosure provides a method for implementing a CDN based on an SDN, which includes: an application unit, orchestration unit, control unit and data forwarding unit in the SDN.

The application unit includes: a requesting module and an operation module.

The requesting module is configured to add a complete service logic function of the CDN, and when receiving a CDN application request, send a resource requirement request and a service orchestration request to the orchestration unit.

The operation module is configured to, after receiving information indicating completion of a reservation request, execute a related operation according to a content distribution request or a media access request.

The orchestration unit includes: a resource cooperation module and an orchestration feedback module.

The resource cooperation module is configured to receive the resource requirement request and the service orchestration request, perform service orchestration in combination with related information of the SDN, and send the reservation request for a required resource to the control unit according to the service orchestration.

The orchestration feedback module is configured to, after the reservation request for the required resource is completed, feed the information indicating completion of the reservation request for the required resource back to the application unit.

The control unit is configured to allocate the resource required by a CDN application according to the reservation request, determine content distribution and content delivery paths in combination with a network load balancing and routing condition; after the allocated resource required by the CDN application is obtained, create a data link Layer L2 and network Layer L3 forwarding table according to a related forwarding policy of an SDN control plane, transmit the data link Layer L2 and network Layer L3 forwarding table to the data forwarding unit, and feed completion of the reservation request for the required resource back to the orchestration unit; and the data forwarding unit includes related network equipment for SDN data forwarding, and is configured to store related data of the CDN application according to the allocated resource required by the CDN application, and perform data forwarding according to the L2 and L3 forwarding table determined by the control unit when the application unit executes the related operation.

In an exemplary embodiment, the related operation includes: content distribution, content caching, content routing and content delivery corresponding to the content distribution request or the media access request.

In an exemplary embodiment, the operation module includes: a distribution sub-module, a caching sub-module, a delivery sub-module and a routing sub-module, herein the distribution sub-module is configured to, after receiving the information indicating completion of the reservation request, extract a content stored in a content database, and then fill the content into a content distribution node of the CDN according to a preset distribution policy and the content distribution request;

the caching sub-module is configured to receive a content of the content distribution node to cache, and pre-cache a content accessed by a user terminal in a content caching node of the CDN according to a caching policy to rapidly provide a hotspot content for a neighboring content delivery node and the user terminal to use;

the delivery sub-module is configured to extract a content in the content caching node to provide for the content delivery node of the CDN for content streaming according to the media access request, and transmit the streamed content to the user terminal; and the routing sub-module is configured to dynamically establish a network connection for the content distribution node and the content caching node according to a load balancing policy and a content distribution path policy, and dynamically establish a network connection for the user terminal and the content delivery node according to the load balancing policy and a content delivery path policy.

In an exemplary embodiment, the application unit further includes a load balancing module, configured to dynamically provide a server node of media service for the user terminal according to a real-time load condition of the content delivery node, dynamically determine the content caching node according to a content load distribution condition, dynamically determine a network path for content distribution according to a content distribution path network condition, and dynamically determine a network path for content delivery according to a content delivery path network condition.

In an exemplary embodiment, the orchestration unit further includes: an application supporting module, an application engine module, a management module and an operation supporting module.

The application supporting module is configured to receive the CDN application request to perform registration, and acquire support information of an application engine required by the CDN application.

The application engine module is configured to call a capability engine in the SDN to support the CDN application according to the support information of the application engine required by the CDN application.

The management module is configured to manage the capability engine called for the CDN application in the SDN and an application resource meeting the CDN application request, and under the condition that a service chain function is supported, according to access information defined in a service chain, determine an access sequence of the called capability engine in the SDN and a related application resource, and execute a related operation; and the operation supporting module is configured to charge for the allocated resource required by the CDN application and the called capability engine in the SDN.

In an exemplary embodiment, the control unit is further configured to call a firewall to ensure security of node access in the CDN.

In an exemplary embodiment, the application unit further includes an external application interface, configured to receive the CDN application request, receive an external instruction and adjust one or more of the following units: the application unit, the orchestration unit, the control unit and the data forwarding unit;

the application unit is connected with the orchestration unit through an arctic interface;

the orchestration unit is connected with the control unit through a northbound interface; and the control unit is connected with the data forwarding unit through a southbound interface.

In an exemplary embodiment, the delivery sub-module is configured to: extract the content in the content caching node to provide for the content delivery node of the CDN according to the media access request, perform packing and encapsulation according to a streaming media transmission technology of the content delivery node, and add related information about content streaming.

An embodiment of the present disclosure further provides a method for implementing a CDN based on an SDN, herein, a complete service logic function of the CDN is added on an application layer of the SDN, and the method including that:

an application unit sends a resource requirement request and a service orchestration request to an orchestration unit when receiving a CDN application request;

the orchestration unit performs service orchestration according to the received resource requirement request and service orchestration request in combination with related information of the SDN, and sends a reservation request for a required resource to a control unit according to service orchestration;

the control unit allocates the resource required by a CDN application according to the reservation request, determines content distribution and content delivery paths in combination with a network load balancing and routing condition; after the allocated resource required by the CDN application is obtained, creates a data link layer L2 and network layer L3 forwarding table according to a related forwarding policy of an SDN control plane, and transmits the data link layer L2 and network layer L3 forwarding table to a data forwarding unit;

after the control unit feeds information indicating completion of the reservation request back to the application unit through the orchestration unit, the application unit executes a related operation according to a received content distribution request or media access request; and when the application unit executes the related operation, the data forwarding unit performs data forwarding according to the L2 and L3 forwarding table.

In an exemplary embodiment, the related information of the SDN includes: network topology information, network load balancing information, network routing information and firewall deployment information of the SDN.

In an exemplary embodiment, the related operation includes: content distribution, content caching, content routing and content delivery corresponding to the content distribution request or the media access request.

In an exemplary embodiment, related network equipment for SDN data forwarding includes: an OPENFLOW switch, OPENFLOW router, OPENFLOW gateway, OPENFLOW storage server and OPENFLOW custom equipment for SDN data forwarding.

In an exemplary embodiment, the resource required by the CDN application includes: an access network resource, transmission network resource and data center network resource required by the CDN application; and the related forwarding policy includes: a hotspot distribution policy, a load balancing policy and a content routing policy.

In an exemplary embodiment, the step that the application unit executes the related operation includes that:

the application unit extracts a content stored in a content database, and then fills the content into a content distribution node of the CDN according to a preset distribution policy and the content distribution request after receiving the information indicating completion of the reservation request;

the application unit receives a content of the content distribution node to cache, and pre-caches a content accessed by a user terminal in a content caching node of the CDN according to a caching policy to rapidly provide a hotspot content for a neighboring content delivery node and the user terminal to use; and the application unit extracts the content in the content caching node to provide for the content delivery node of the CDN for content streaming according to the media access request, and transmits the streamed content to the user terminal.

In an exemplary embodiment, the method further includes that:

a server node of media service is dynamically provided for the user terminal according to a real-time load condition of the content delivery node;

the content caching node is dynamically determined according to a content load distribution condition;

a network path for content distribution is dynamically determined according to a content distribution path network condition;

a network path for content delivery is dynamically determined according to a content delivery path network condition; and a network connection is dynamically established for the content distribution node and the content caching node according to the load balancing policy and a content distribution path policy, and a network connection is dynamically established for the user terminal and the content delivery node according to the load balancing policy and a content delivery path policy.

In an exemplary embodiment, when the orchestration unit performs service orchestration according to the received resource requirement request and service orchestration request in combination with the related information of the SDN, the method further includes that:

the orchestration unit receives the CDN application request to perform registration, and acquires support information of an application engine required by the CDN application; and a capability engine in the SDN is called to support the CDN application according to the support information of the application engine required by the CDN application.

In an exemplary embodiment, the method further includes that:

the capability engine called for the CDN application in the SDN and the allocated resource required by the CDN application are managed, and under the condition that a service chain function is supported, according to access information defined in a service chain, an access sequence of the called capability engine in the SDN and a related application resource is determined, and a related operation is executed; and the application resource requested for the CDN application and the called capability engine in the SDN are charged for.

In an exemplary embodiment, the method further includes that: the control unit calls a firewall for a node in the CDN to ensure security of node access in the CDN.

In an exemplary embodiment, the cached content is: the whole file of the content, fragmentation of the content file or a data packet obtained by content file streaming.

In an exemplary embodiment, the step that the content in the content caching node is extracted and provided for the content delivery node of the CDN for content streaming and the streamed content is transmitted to the user terminal includes that: the content in the content caching node is extracted and provided for the content delivery node of the CDN, and is packed and encapsulated according to a streaming media transmission technology of the content delivery node, and related information about content streaming is added.

An embodiment of the present disclosure further provides a computer-readable storage medium, which stores a program instruction. when executed, the program instruction can implement the abovementioned method.

Compared with a related technology, the technical solutions provided by the embodiments of the present disclosure include that: the application unit, the orchestration unit, control unit and data forwarding unit in the SDN. Specifically, the application unit includes the requesting module and the operation module. Herein, the requesting module is configured to add the complete service logic function of the CDN, and when the CDN application request is received, send the resource requirement request and the service orchestration request to the orchestration unit. The operation module is configured to, after receiving the information indicating completion of the reservation request, execute the related operation according to the content distribution request or the media access request. The orchestration unit includes: the resource cooperation module and the orchestration feedback module. Herein, the resource cooperation module is configured to receive the resource requirement request and the service orchestration request, perform service orchestration in combination with the related information of the SDN, and send the reservation request for the required resource to the control unit according to service orchestration. The orchestration feedback module is configured to, after the reservation request for the required resource is completed, feed the information indicating completion of the reservation request for the required resource back to the application unit. The control unit is configured to allocate the resource required by the CDN application according to the reservation request, determine the content distribution and content delivery paths in combination with the network load balancing and routing condition; after the allocated resource required by the CDN application is obtained, create the L2 and L3 forwarding table according to the related forwarding policy of the SDN control plane, transmit the L2 and L3 forwarding table to the data forwarding unit, and feed completion of the reservation request for the required resource back to the orchestration unit. The data forwarding unit includes the related network equipment for SDN data forwarding, configured to store the related data of the CDN application according to the allocated resource required by the CDN application, and perform data forwarding according to the L2 and L3 forwarding table determined by the control unit when the application unit executes the related operation. According to the embodiments of the present disclosure, through the system for implementing the CDN based on the SDN, the resource required by the CDN application is allocated through the CDN application request, the content distribution and content delivery paths are determined for network adjusting in combination with the network load balancing and routing condition. Therefore, the problems of closure of a CDN bearer network, exclusiveness of hardware and complexity in management are effectively solved, and planning, deployment and resource configuration of the resource required by the CDN and a forwarding path are implemented.

DETAILED DESCRIPTION

It is important to note that the embodiments in the present disclosure and characteristics in the embodiments may be freely combined under the condition of no conflicts.

Embodiment One

Figure 1:
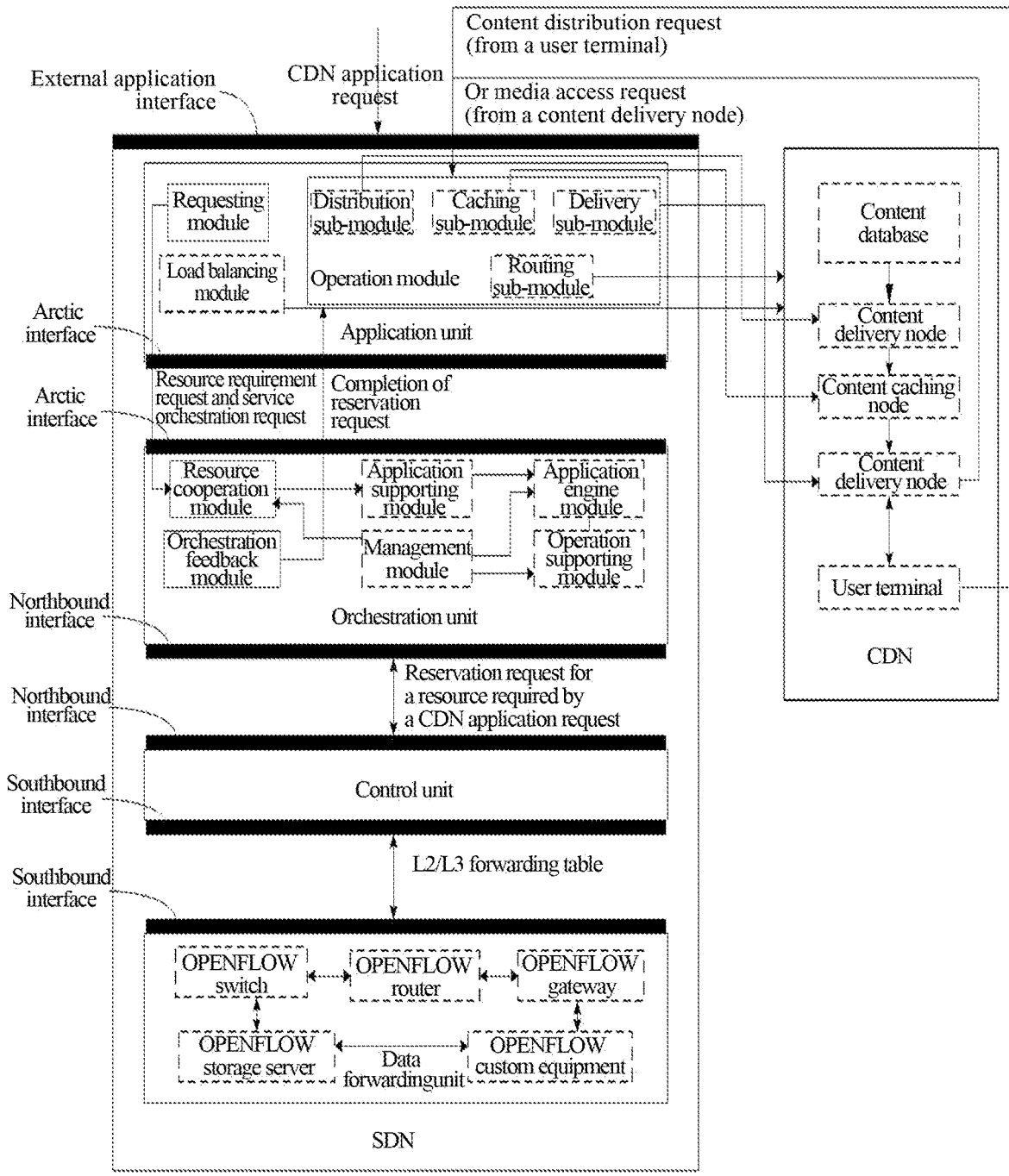
FIG. 1 is a structure block diagram of a system for implementing a CDN based on an SDN according to embodiment one of the present disclosure.

FIG. 1 is a structure block diagram of a system for implementing a CDN based on an SDN according to embodiment one of the present disclosure. As shown in FIG. 1, the system includes: an application unit, orchestration unit, control unit and data forwarding unit in the SDN.

The application unit includes: a requesting module and an operation module. The requesting module is configured to add a complete service logic function of the CDN, and when a CDN application request is received, send a resource requirement request and a service orchestration request to the orchestration unit.

The operation module is configured to, after information indicating completion of a reservation request is received, execute a related operation according to a content distribution request or a media access request.

In an alternative embodiment, the operation module includes: a distribution sub-module, a caching sub-module, a delivery sub-module and a routing sub-module.

The distribution sub-module is configured to, after the information indicating completion of the reservation request is received, extract a content stored in a content database and then fill the content into a content distribution node of the CDN according to a preset distribution policy and the content distribution request.

It is important to note that the content database mentioned here refers to a database storing a media content and existing in a multimedia server of the related technology, and also includes a corresponding file server storing a media file and the like.

The caching sub-module is configured to receive a content of the content distribution node to cache, and pre-cache a content accessed by a user terminal in a content caching node of the CDN according to a caching policy to rapidly provide a hotspot content for a neighboring content delivery node and the user terminal to use.

Herein, the cached content is: the whole file of the content, fragmentation of the content file or data packets obtained by content file streaming.

It is important to note that the content caching node usually appears in pair with the content delivery node; when the cached content rises to a hotspot content of an area, the hotspot content should be distributed to another delivery node in advance or cached in another caching node. Here, fragmentation is mainly responsible for performing fragmentation processing on an original file with a relatively large content volume for parallel transmission and distributed storage according to a required granularity (such as 32 KBytes, 64 KBytes, 256 KBytes, 512 KBytes, 1 MBytes, 2 MBytes, 4 MBytes, 8 MBytes, 16 MBytes, 32 Mbytes or 64 Mbytes or the like).

The delivery sub-module is configured to extract the content in the content caching node to provide for the content delivery node of the CDN for content streaming according to the media access request, and transmit the streamed content to the user terminal.

The delivery sub-module is configured to extract the content in the content caching node to provide for the content delivery node of the CDN according to the media access request, perform packing and encapsulation according to a streaming media transmission technology of the content delivery node, and add related information about content streaming.

It is important to note that selection of the streaming media transmission technology (such as IETF Real-time Transport Protocol (RTP), Moving Picture Experts Group (MPEG) Transport Stream (TS), MPEG Dynamic Adaptive Streaming over Hyper Text Transport Protocol (DASH) and MPEG Media Transport (MMT) and so on) is implemented according to the content delivery node, and adding the related information about content streaming includes: filling required information such as a sequence number and a timestamp and so on to ensure that data packets transmitted through a network may be effectively parsed and recovered even though the data packets are not sequentially received by a receiver.

The routing sub-module is configured to dynamically establish a network connection (such as an IP connection) for the content distribution node and the content caching node according to a load balancing policy and a content distribution path policy, and dynamically establish a network connection for the user terminal and the content delivery node according to the load balancing policy and a content delivery path policy.

Herein, a content delivery path should be evaluated on the basis of a comprehensive efficiency and cost (such as traffic×cost) optimum principle. For content routing of a content distribution part, traffic cost is mainly considered on the premise of meeting efficiency. For content routing of a content delivery part, network performance and experience quality are mainly considered. Content routing may produce multiple reachable routes for reasons of file fragmentation, distributed storage and the like, and may be dynamically adjusted according to bottom-layer network topology information provided by the SDN.

The load balancing policy refers to: how to perform resource allocation for a load; and when the load exceeds a preset threshold value (such as 60%-70%), it is necessary to perform load sharing; and the path policy should be a path optimum policy, and a criterion for path optimum may be path shortest, cost lowest and the like.

It is important to note that the preset distribution policy, caching policy, load balancing policy, content distribution path policy and content delivery path policy are policies obtained by analysis and summarization of those skilled in the art, and may be practically adjusted according to different CDN application requirements, SDN networks, engines and the like.

The related operation includes: content distribution, content caching, content routing and content delivery corresponding to the content distribution request or the media access request.

In an alternative embodiment, the application unit further includes a load balancing module, configured to dynamically provide a server node of media service for the user terminal according to a real-time load condition of the content delivery node, dynamically determine the content caching node according to a content load distribution condition, dynamically determine a network path for content distribution according to a content distribution path network condition, and dynamically determine a network path for content delivery according to a content delivery path network condition.

In the CDN, dynamic regulation may not be implemented because of own property of the CDN, and after the CDN is implemented based on the SDN in the embodiments of the present disclosure, dynamic regulation may be implemented by virtue of a property of the SDN.

The orchestration unit includes: a resource cooperation module and an orchestration feedback module.

The resource cooperation module is configured to receive the resource requirement request and the service orchestration request, perform service orchestration in combination with related information of the SDN, and send the reservation request for a required resource to the control unit according to the service orchestration.

It is important to note that "combination" mentioned here refers to a process set by those skilled in the art according to a practical condition, for example: an available state of the network is judged and the most proper network is selected and configured by virtue of network topology information; network path selection is assisted by virtue of network load balancing information; network route selection is performed by virtue of network routing information; and firewall security selection is performed by virtue of firewall deployment information.

Here, the related information of the SDN includes: network topology information, network load balancing information, network routing information and firewall deployment information of the SDN.

The orchestration feedback module is configured to, after the reservation request for the required resource is completed, feed the information indicating completion of the reservation request for the required resource back to the application unit.

In an alternative embodiment, the orchestration unit further includes: an application supporting module, an application engine module, a management module and an operation supporting module.

The application supporting module is configured to receive the CDN application request to perform registration, and acquire support information of an application engine required by the CDN application.

The application engine module is configured to call a capability engine in the SDN to support the CDN application according to the support information of the application engine required by the CDN application.

The management module is configured to manage the capability engine called for a CDN application in the SDN and an application resource meeting the CDN application request, and under the condition that a service chain function is supported, according to access information defined in a service chain, determine an access sequence of the called capability engine in the SDN and a related application resource, and execute a related operation.

The operation supporting module is configured to charge for the allocated resource required by the CDN application and the called capability engine in the SDN.

The control unit is configured to allocate the resource required by the CDN application according to the reservation request, determine content distribution and content delivery paths in combination with a network load balancing and routing condition, after the allocated resource required by the CDN application is obtained, create a data link Layer L2 and network Layer L3 forwarding table according to a related forwarding policy of an SDN control plane, transmit the data link Layer L2 and network Layer L3 forwarding table to the data forwarding unit, and feed completion of the reservation request for the required resource back to the orchestration unit. Here, the forwarding related policy includes: a hotspot distribution policy, a content load balancing policy and a network load balancing policy. The L2 and L3 forwarding table may be one or two tables as long as L2 and L3 information is included.

It is important to note that the related forwarding policy of the SDN control plane belongs to existing policy information of the SDN during creation of the L2 and L3 forwarding table according to the related forwarding policy of the SDN control plane.

The control unit is further configured to call a firewall to ensure security of node access in the CDN.

The data forwarding unit includes related network equipment for SDN data forwarding, and is configured to store related data of the CDN application according to the allocated resource required by the CDN application, and perform data forwarding according to the L2 and L3 forwarding table determined by the control unit when the application unit executes the related operation. Here, the related network equipment for SDN data forwarding includes: an OPENFLOW switch, OPENFLOW router, OPENFLOW gateway, OPENFLOW storage server and OPENFLOW custom equipment (such as other equipment supporting OPENFLOW protocols) for SDN data forwarding.

The resource required by the CDN application includes: an access network resource, transmission network resource and data center network resource required by the CDN application.

It is important to note that the resource required by the CDN application is evaluated and determined through a path, a bandwidth, traffic, a storage space, a time length, quality of service, a service level, a charge and the like.

The application unit further includes an external application interface, configured to receive the CDN application request, receive an external instruction and adjust one or more of the following units: the application unit, the orchestration unit, the control unit and the data forwarding unit.

The application unit is connected with the orchestration unit through an arctic interface.

The orchestration unit is connected with the control unit through a northbound interface.

The control unit is connected with the data forwarding unit through a southbound interface.

According to the system for implementing the CDN based on the SDN in the embodiments of the present disclosure, the problems of closure of a CDN bearer network, exclusiveness of hardware and complexity in management are effectively solved, and reasonable selection of the resource required by the CDN, an engine and a forwarding path is realized.

Embodiment Two

Figure 2:
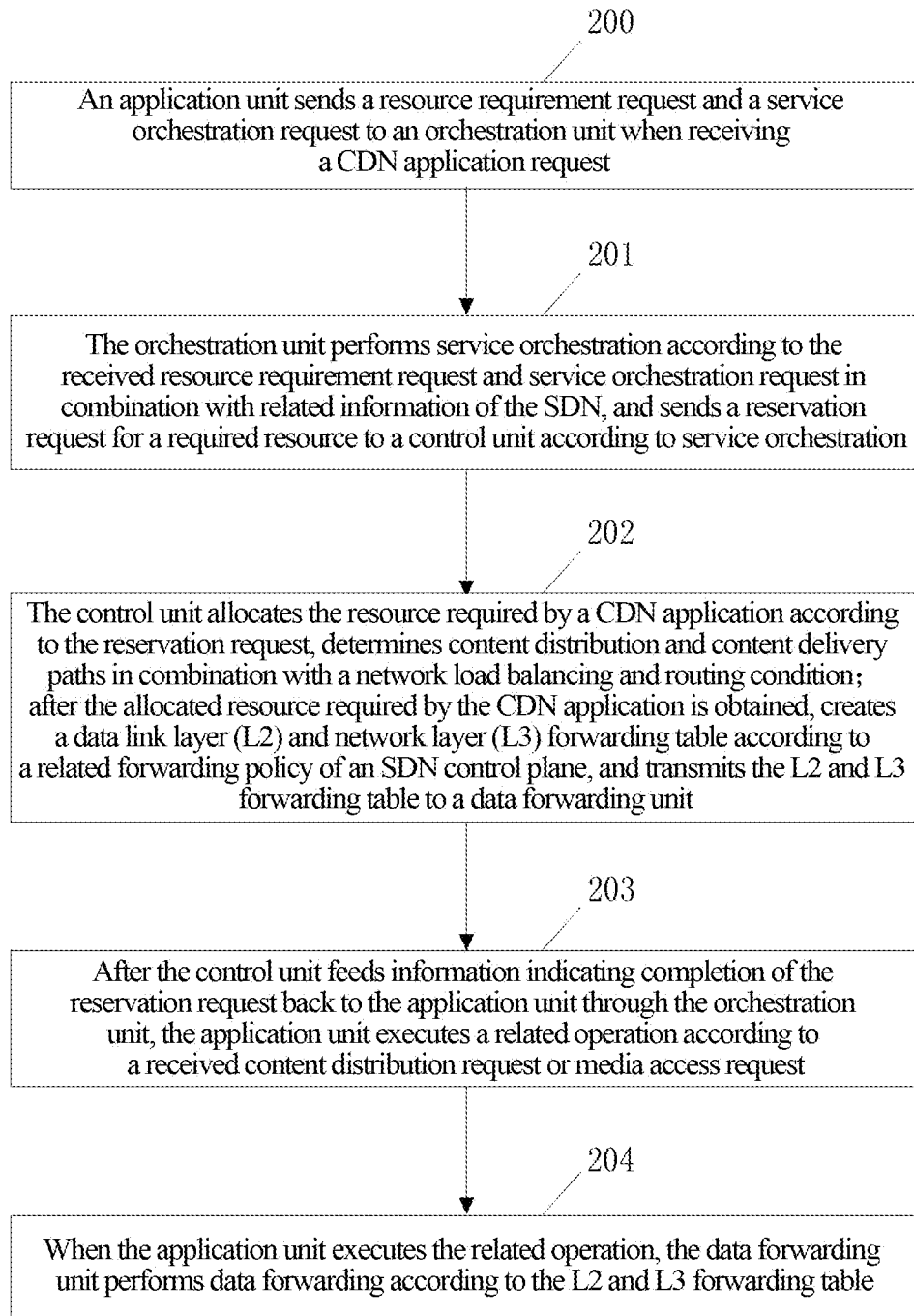
FIG. 2 is a flowchart of a method for implementing a CDN based on an SDN according to embodiment two of the present disclosure.

FIG. 2 is a flowchart of a method for implementing a CDN based on an SDN according to embodiment two of the present disclosure. A complete service logic function of the CDN is added on an application layer of the SDN. As shown in FIG. 2, the method includes the following steps 200-204.

In step 200, an application unit sends a resource requirement request and a service orchestration request to an orchestration unit when receiving a CDN application request.

In step 201, the orchestration unit performs service orchestration according to the received resource requirement request and service orchestration request in combination with related information of the SDN, and sends a reservation request for a required resource to a control unit according to service orchestration.

In the step, the related information of the SDN includes: network topology information, network load balancing information, network routing information and firewall deployment information of the SDN.

In step 202, the control unit allocates the resource required by a CDN application according to the reservation request, determines content distribution and content delivery paths in combination with a network load balancing and routing condition; after the allocated resource required by the CDN application is obtained, creates a data link L2 and network L3 forwarding table according to a related forwarding policy of an SDN control plane, and transmits the L2 and L3 forwarding tables to a data forwarding unit.

At first, the resource (which mainly includes computing, storage and network resources) required by the CDN application is determined, and then the content distribution and content delivery paths are determined in combination with the allocated resource and the network load balancing and routing condition, and after the resource requested to be allocated and required by the CDN application is obtained, the data link L2 and network L3 forwarding table is created and transmitted to the data forwarding unit. Determining the content distribution and content delivery paths may be considered as a part of network resource allocation.

In the step, the resource required by the CDN application includes: an access network resource, transmission network resource and data center network resource required by the CDN application. The forwarding related policy includes: a hotspot distribution policy, a load balancing policy and a content routing policy.

In step 203, after the control unit feeds information indicating completion of the reservation request back to the application unit through the orchestration unit, the application unit executes a related operation according to a received content distribution request or media access request.

In the step, the related operation includes: content distribution, content caching, content routing and content delivery corresponding to the content distribution request or the media access request.

In step 204, when the application unit executes the related operation, the data forwarding unit performs data forwarding according to the L2 and L3 forwarding table.

The step that the application unit executes the related operation includes that:

the application unit extracts a content stored in a content database and then fills the content into a content distribution node of the CDN according to a preset distribution policy and the content distribution request after receiving the information indicating completion of the reservation request;

the application unit receives a content of the content distribution node to cache, and pre-caches a content accessed by a user terminal in a content caching node of the CDN according to a caching policy to rapidly provide a hotspot content for a neighboring content delivery node and the user terminal to use, herein, the cached content is: the whole file of the content, a fragment of the content file or a data packet obtained by content file streaming; and the application unit extracts the content in the content caching node to provide for the content delivery node of the CDN for content streaming according to the media access request, and transmits the streamed to the user terminal, including that: the content in the content caching node is extracted and provided for the content delivery node of the CDN, and is packed and encapsulated according to a streaming media transmission technology of the content delivery node, and related information about content streaming is added.

In the step, related network equipment for SDN data forwarding includes: an OPENFLOW switch, OPENFLOW router, OPENFLOW gateway, OPENFLOW storage server and OPENFLOW custom equipment (such as other equipment supporting an OPENFLOW protocol) for SDN data forwarding.

In an alternative embodiment, after the application unit executes the related operation, the method of the embodiment of the present disclosure further includes that:

a server node of media service is dynamically provided for the user terminal according to a real-time load condition of the content delivery node;

the content caching node is dynamically determined according to a content load distribution condition;

a network path for content distribution is dynamically determined according to a content distribution path network condition;

a network path for content delivery is dynamically determined according to a content delivery path network condition; and a network connection is dynamically established for the content distribution node and the content caching node according to the load balancing policy and a content distribution path policy, and a network connection is dynamically established for the user terminal and the content delivery node according to the load balancing policy and a content delivery path policy.

In an alternative embodiment, when the orchestration unit performs service orchestration according to the received resource requirement request and service orchestration request in combination with the related information of the SDN, the method of the embodiment of the present disclosure further includes that:

the orchestration unit receives the CDN application request to perform registration, and acquires support information of an application engine required by the CDN application; and a capability engine in the SDN is called to support the CDN application according to the support information of the application engine required by the CDN application.

In an alternative embodiment, after the capability engine in the SDN is called according to the support information of the application engine required by the CDN application, the method of the embodiment of the present disclosure further includes that:

the capability engine called for the CDN application in the SDN and the allocated resource required by the CDN application are managed, and under the condition that a service chain function is supported, according to access information defined in a service chain, an access sequence of the called capability engine in the SDN and a related application resource is determined and a related operation is executed; and the application resource requested for the CDN application and the called capability engine in the SDN are charged for.

In an alternative embodiment, the method of the embodiment of the present disclosure further includes that: the control unit in the SDN calls a firewall for nodes in the CDN to ensure security of node access in the CDN.

Those skilled in the art may understand that all or part of the steps in the abovementioned method may be implemented by related hardware instructed by a program, and the abovementioned program may be stored in a computer-readable storage medium, such as a read-only memory, a magnetic disk, an optical disk or the like. Alternatively, all or part of the steps of the abovementioned embodiments may also be implemented by virtue of one or more integrated circuits. Corresponding, each module or unit in the abovementioned embodiment may be implemented in form of hardware, and may also be implemented in form of software function module. The embodiments of the present disclosure are not limited to hardware and software combination of any specific form.

INDUSTRIAL APPLICABILITY

According to the embodiments of the present disclosure, through the system for implementing the CDN based on the SDN, the problems of closure of a CDN bearer network, exclusiveness of hardware and complexity in management are effectively solved, and reasonable selection of the resource required by the CDN, an engine and a forwarding path is implemented.

What is claimed is:

1. A system for implementing a Content Distribution Network, CDN, based on a Software Defined Network, SDN, comprising: a processor and a storage device, wherein the storage device stores processor-executable programs, and the programs comprise an application unit, an orchestration unit, a control unit and a data forwarding unit in the SDN, wherein the application unit is connected with the orchestration unit through an arctic interface, the orchestration unit is connected with the control unit through a northbound interface, and the control unit is connected with the data forwarding unit through a southbound interface;

wherein the application unit comprises a requesting module and an operation module, the orchestration unit comprises a resource cooperation module and an orchestration feedback module, wherein the requesting module is configured to add a complete service logic function of the CDN, and when receiving a CDN application request, send a resource requirement request and a service orchestration request to the resource cooperation module;

the operation module is configured to, after receiving information indicating completion of a reservation request, execute a related operation according to a content distribution request or a media access request; wherein the related operation comprises content distribution, content caching, content routing and content delivery corresponding to the content distribution request or the media access request;

the resource cooperation module is configured to receive the resource requirement request and the service orchestration request from the requesting module, perform service orchestration in combination with related information of the SDN, and send the a reservation request for a resource required by the CDN application to the control unit according to the service orchestration; wherein the resource required by the CDN application comprises an access network resource, transmission network resource and data center network resource required by the CDN application, and wherein the related information of the SDN comprises: network topology information, network load balancing information, network routing information and firewall deployment information of the SDN;

the orchestration feedback module is configured to, after the reservation request for the required resource is completed, feed the information indicating completion of the reservation request for the required resource back to the operation module;

the control unit is configured to allocate the resource required by the CDN application according to the reservation request, determine content distribution and content delivery paths in combination with a network load balancing and routing condition; after the allocated resource required by the CDN application is obtained, create a data link Layer L2 and network Layer L3 forwarding table according to a related forwarding policy of an SDN control plane, transmit the allocated resource required by the CDN application and the data link Layer L2 and network Layer L3 forwarding table to the data forwarding unit, and feed completion of the reservation request for the required resource back to the orchestration feedback module; wherein the related forwarding policy comprises: a hotspot distribution policy, a load balancing policy and a content routing policy; and the data forwarding unit comprises related network equipment for SDN data forwarding, and is configured to store related data of the CDN application according to the allocated resource required by the CDN application, and perform data forwarding according to the L2 and L3 forwarding table determined by the control unit when the operation module executes the related operation, wherein the related network equipment for SDN data forwarding comprises: an OPENFLOW switch, an OPENFLOW router, an OPENFLOW gateway, an OPENFLOW storage server and an OPENFLOW custom equipment for SDN data forwarding.

2. The system according to claim 1, wherein the operation module comprises: a distribution sub-module, a caching sub-module, a delivery sub-module and a routing sub-module, wherein the distribution sub-module is configured to, after receiving the information indicating completion of the reservation request, extract a content stored in a content database, and then fill the content into a content distribution node of the CDN according to a preset distribution policy and the content distribution request;

the caching sub-module is configured to receive a content of the content distribution node to cache, and pre-cache a content accessed by a user terminal in a content caching node of the CDN according to a caching policy to rapidly provide a hotspot content for a neighboring content delivery node and the user terminal to use;

the delivery sub-module is configured to extract a content in the content caching node to provide for the content delivery node of the CDN for content streaming according to the media access request, and transmit the streamed content to the user terminal; and the routing sub-module is configured to dynamically establish a network connection for the content distribution node and the content caching node according to a load balancing policy and a content distribution path policy, and dynamically establish a network connection for the user terminal and the content delivery node according to the load balancing policy and a content delivery path policy.

3. The system according to claim 2, wherein the application unit further comprises a load balancing module, configured to dynamically provide a server node of media service for the user terminal according to a real-time load condition of the content delivery node, dynamically determine the content caching node according to a content load distribution condition, dynamically determine a network path for content distribution according to a content distribution path network condition, and dynamically determine a network path for content delivery according to a content delivery path network condition.

4. The system according to claim 3, wherein the orchestration unit further comprises: an application supporting module, an application engine module, a management module and an operation supporting module, wherein the application supporting module is configured to receive the CDN application request to perform registration, and acquire support information of an application engine required by the CDN application;

the application engine module is configured to call a capability engine in the SDN to support the CDN application according to the support information of the application engine required by the CDN application;

the management module is configured to manage the capability engine called for the CDN application in the SDN and an application resource meeting the CDN application request, and under the condition that a service chain function is supported, according to access information defined in a service chain, determine an access sequence of the called capability engine in the SDN and a related application resource, and execute a related operation; and the operation supporting module is configured to charge for the allocated resource required by the CDN application and the called capability engine in the SDN.

5. The system according to claim 4, wherein the control unit is further configured to call a firewall to ensure security of node access in the CDN.

6. The system according to claim 5, wherein
the application unit further comprises an external application interface, configured to receive the CDN application request, receive an external instruction and adjust one or more of the following units: the application unit, the orchestration unit, the control unit and the data forwarding unit;

the application unit is connected with the orchestration unit through an arctic interface;

the orchestration unit is connected with the control unit through a northbound interface; and the control unit is connected with the data forwarding unit through a southbound interface.

7. The system according to claim 2, wherein the delivery sub-module is configured to: extract the content in the content caching node to provide for the content delivery node of the CDN according to the media access request, perform packing and encapsulation according to a streaming media transmission technology of the content delivery node, and add related information about content streaming.

8. A method for implementing a Content Distribution Network, CDN, based on a Software Defined Network, SDN, wherein a complete service logic function of the CDN is added on an application layer of the SDN, and the method comprising that:

sending, by an application unit, a resource requirement request and a service orchestration request to an orchestration unit when receiving a CDN application request;

performing, by the orchestration unit according to the received resource requirement request and service orchestration request, service orchestration in combination with related information of the SDN, and sending a reservation request for a resource required by the CDN application to a control unit according to service orchestration; wherein the resource required by the CDN application comprises an access network resource, transmission network resource and data center network resource required by the CDN application, wherein the related information of the SDN comprises: network topology information, network load balancing information, network routing information and firewall deployment information of the SDN;

allocating, by the control unit, the resource required by the CDN application according to the reservation request, determining content distribution and content delivery paths in combination with a network load balancing and routing condition; after the allocated resource required by the CDN application is obtained, creating a data link Layer L2 and network Layer L3 forwarding table according to a related forwarding policy of an SDN control plane, and transmitting the allocated resource required by the CDN application and the data link Layer L2 and the network Layer L3 forwarding table to a data forwarding unit; wherein the related forwarding policy comprises: a hotspot distribution policy, a load balancing policy and a content routing policy; wherein the data forwarding unit comprises related network equipment for SDN data forwarding, and the related network equipment for SDN data forwarding comprises: an OPENFLOW switch, an OPENFLOW router, an OPENFLOW gateway, an OPENFLOW storage server and an OPENFLOW custom equipment for SDN data forwarding;

after the control unit feeds information indicating completion of the reservation request back to the application unit through the orchestration unit, executing, by the application unit, a related operation according to a received content distribution request or a received media access request; wherein the related operation comprises content distribution, content caching, content routing and content delivery corresponding to the received content distribution request or the received media access request; and when the application unit executes the related operation, performing, by the data forwarding unit, data forwarding according to the L2 and L3 forwarding table.

9. The method according to claim 8, wherein executing, by, the application unit, the related operation comprises:

extracting, by the application unit, a content stored in a content database, and then filling the content into a content distribution node of the CDN according to a preset distribution policy and the content distribution request after receiving the information indicating completion of the reservation request;

receiving, by the application unit, a content of the content distribution node to cache, and pre-caching a content accessed by a user terminal in a content caching node of the CDN according to a caching policy to rapidly provide a hotspot content for a neighboring content delivery node and the user terminal to use; and extracting, by the application unit, the content in the content caching node to provide for the content delivery node of the CDN for content streaming according to the media access request, and transmits the streamed content to the user terminal; and wherein the cached content is: the whole file of the content, fragmentation of the content file or a data packet obtained by content file streaming.

10. The method according to claim 8, the method further comprising:

dynamically providing a server node of media service for the user terminal according to a real-time load condition of the content delivery node;

dynamically determining the content caching node according to a content load distribution condition;

dynamically determining a network path for content distribution according to a content distribution path network condition;

dynamically determining a network path for content delivery according to a content delivery path network condition; and dynamically establishing a network connection for the content distribution node and the content caching node according to the load balancing policy and a content distribution path policy, and dynamically establishing a network connection for the user terminal and the content delivery node according to the load balancing policy and a content delivery path policy.

11. The method according to claim 10, when the orchestration unit performs service orchestration according to the received resource requirement request and service orchestration request in combination with the related information of the SDN, the method further comprising:
- receiving, by the orchestration unit, the CDN application request to perform registration, and acquiring support information of an application engine required by the CDN application; and
- calling a capability engine in the SDN to support the CDN application according to the support information of the application engine required by the CDN application.

12. The method according to claim 11, the method further comprising:
- managing the capability engine called for the CDN application in the SDN and the allocated resource required by the CDN application, and under the condition that a service chain function is supported, according to access information defined in a service chain, determining an access sequence of the called capability engine in the SDN and a related application resource, and executing a related operation; and
- charging for the application resource requested for the CDN application and the called capability engine in the SDN.

13. The method according to claim 12, the method further comprising: calling, by the control unit, a firewall for a node in the CDN to ensure security of node access in the CDN.

14. The method according to claim 9, wherein the extracting a content in the content caching node to provide for the content delivery node of the CDN for content streaming and transmitting the streamed content to the user terminal comprises: extracting the content in the content caching node to provide for the content delivery node of the CDN, performing packing and encapsulation according to a streaming media transmission technology of the content delivery node, and adding related information about content streaming.

15. A non-transitory computer-readable storage medium, which stores a program instruction, and wherein, when executed, the program instruction can implement the method according to claim 8.

* * * * *